Dec. 16, 1930. H. R. HAERTEL 1,785,081
RUBBER ARTICLES AND METHOD OF PRODUCING THE SAME
Filed July 12, 1929
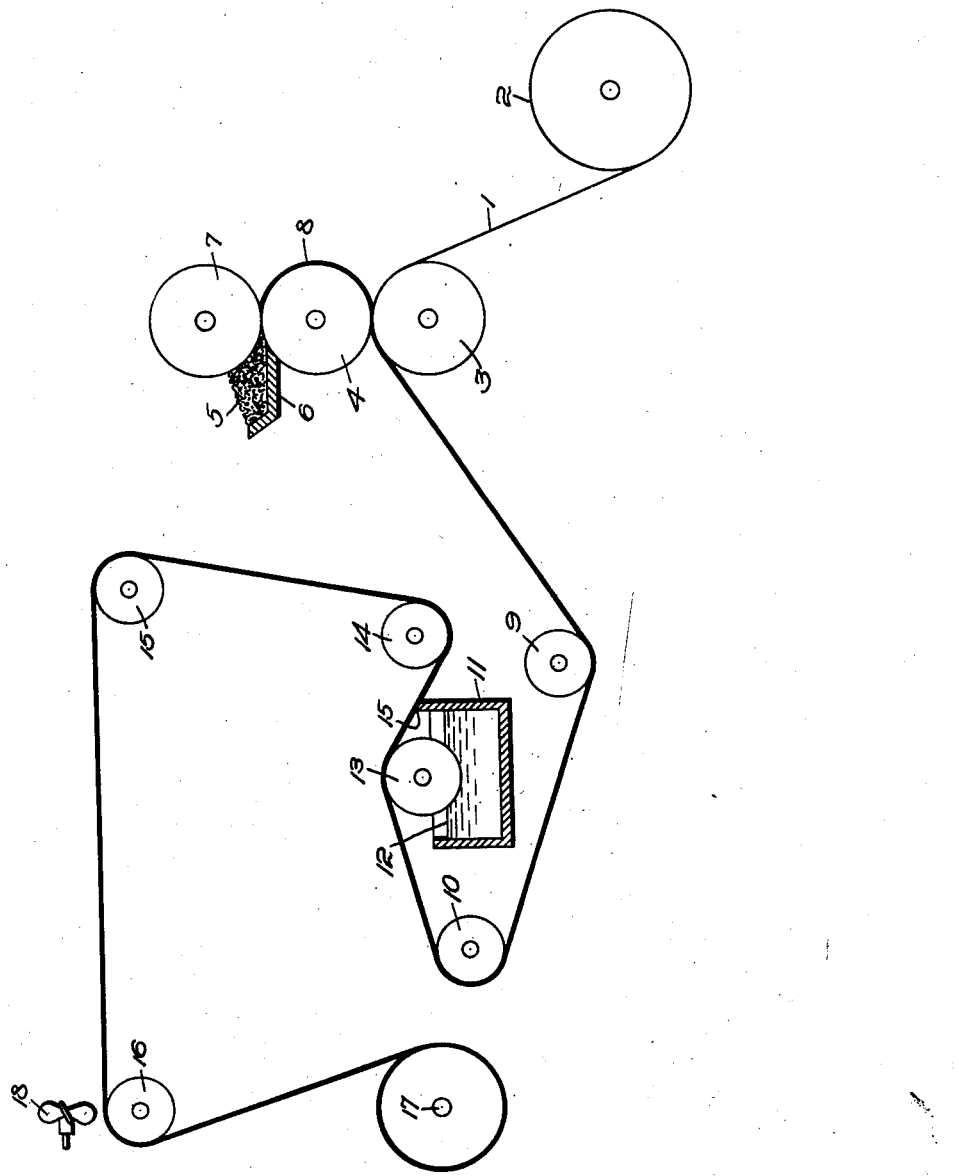

Patented Dec. 16, 1930

1,785,081

UNITED STATES PATENT OFFICE

HANS RICHARD HAERTEL, OF WRENTHAM, MASSACHUSETTS, ASSIGNOR TO THOMAS H. DUMPER, TRUSTEE, OF NEWTON, MASSACHUSETTS

RUBBER ARTICLES AND METHOD OF PRODUCING THE SAME

Application filed July 12, 1929. Serial No. 377,895.

This application is a continuation in part of my earlier application Serial No. 246,616, filed January 13, 1928.

My invention relates to rubber coated articles and to processes of making the same, particularly but not exclusively to rubber coated textile sheets, as for example material for use in making raincoats or the like.

The invention will be best understood from the following description of an example of an article made according to the invention and of one example of the practice of the improved process, while the scope of the invention will be more particularly pointed out in the appended claims.

The drawing shows diagrammatically a calendering machine and auxiliary apparatus for forming rubber coated textile sheets having a coating of lacquer on the surface of the rubber.

Referring to the drawing, a sheet 1 of textile material, such as cotton cloth, is fed from a roll 2 and passed between the lower roll 3 and the intermediate roll 4 of a calendering machine. A mass 5 of suitably colored and prepared rubber compound, containing vulcanizing and other materials commonly employed in the art, may be placed on the shelf 6 and fed to pass between the upper roll 7 and intermediate roll 4 to form a thin layer of rubber 8 which adheres to the surface of the intermediate roll and passes between the latter and the lower roll with the textile sheet, whereby the layer 8 of rubber is caused to adhere to the latter.

Conveniently the calendering rolls may be heated to facilitate the above described operation, such heat aided by the squeezing action of the rolls on the rubber causing the latter to become sticky or tacky. It has been found that the stickiness of the rubber continues to exist even after the rubber becomes cold, which stickiness if not eliminated will prevent handling of the product during subsequent operations thereon.

According to prior practices the surface of the rubber after the sheet leaves the rolls of the calendering machine is treated to eliminate the superficial stickiness or tackiness of the rubber, after which the sheet is removed from the calendering machine and afterward varnished with a shellac solution for improving its appearance and rendering it suitable for use in fabricated articles therefrom after it is cured. According to these prior practices the stickiness or tackiness of the rubber surface is eliminated by dusting or brushing said surface with finely powdered clay or like material, or by treating said surface with organic substances such as zinc stearate, or by halogenizing it, say by treating it with a bromine solution.

All of the above mentioned ways of eliminating the stickiness or tackiness of the rubber surface have been found objectionable in practice. It has been found impossible to apply the powdered clay with such uniformity, or to cause the clay to so adhere to the surface of the rubber, as will prevent a streaked appearance of the varnished product. Furthermore the use of clay causes the air of the room housing the calendering machine to become filled with fine dust which acts to impair the efficiency of the operators. Further such dust becomes distributed by drafts throughout the various rooms and buildings constituting the plant, causing the various rubber products manufactured therein to become specked with the dust. A result of the use of powdered clay therefore is seriously to impair both the quality of the various products produced by the plant and the efficiency of the operators. Treatment of the rubber surface with zinc stearate and the like it has been found imparts a "greasy" appearance to the material and acts to soften the rubber and reduce its elasticity.

It has been found that the use of bromine for eliminating the stickiness of the rubber surface results in an inferior product, for the bromine reacts with the rubber to form chemical combinations containing bromine and oxygen, and therefore acts to eliminate the stickiness of the rubber by destroying the surface of the same in respect to its being rubber. This initial oxidization of the rubber surface by the bromine results in time in deeper penetration of the oxidized layer, with consequent shorter life of the product. Further the use of bromine results in the production of dangerous and disagreeable fumes affecting the health and interfering with the efficiency of the operators.

Further it has been found that the use of clay, and of halogens and organic substances which react with the rubber, tends to darken the rubber surface, probably due to the formation of a somewhat opaque film thereon, with the result that additional expensive coloring material must be added to the rubber compound to overcome this darkening effect.

According to the present invention the elimination of the stickiness or tackiness of the product, and the coating of the same with lacquer, are effected by one operation without the use of objectionable dust or fume forming substances, or substances which soften or oxidize the rubber or darken or otherwise deleteriously affect its surface, thereby eliminating the disadvantages of the prior methods, securing an improved product, and effecting a saving in expensive coloring material, labor costs, and apparatus.

As an example of the coating substance, but without limitation thereto, the rubber surface, after it leaves the calendering rolls, and preferably before it has cooled, may be covered with a film of shellac solution containing magnesium carbonate. This film upon drying will eliminate all stickiness and tackiness of the rubber surface, and will result in the material being coated with a hardened shellac surface which effectively resists scuffing and scratching. Besides these advantages, the surface so treated is suitably prepared for embossing, the coating preventing adherence of the material to the dies of an embossing press when subjected to an embossing process. It has been found impossible to emboss the materials treated by the prior processes herein referred to owing to the tendency of the material to stick to the dies of the embossing press.

As an example of a suitable composition of coating substance the same may consist of 2 gallons commercial standard methyl alcohol, 4 pounds shellac, 6 gallons 26 degrees Baumé commercial ammonia water, and 3 pounds magnesium carbonate. Preferably the shellac is dissolved in the alcohol, and the magnesium carbonate in the ammonia water, and the two solutions mixed.

Referring to the drawing, which shows one example of applying the film of coating material, the rubber coated sheet after it passes between the rolls of the calendering machine is guided over rolls 9 and 10 to a tank 11 containing the liquid constituting the coating substance, the level of which liquid is indicated at 12. As shown, the tank 11 has a roller 13 pivoted above it, the lower portion of the roller extending to beneath the level of the liquid in the tank. The sheet is guided over the tank in contact with the roller 13 by means of the pulley 10 and a second pulley 14, the surface of the rubber contacting the pulley 13. The passage of the sheet over the tank causes the roller 13 to revolve and coat the rubber surface with the liquid from the tank, the liquid being spread and the excess thereof being scraped off the rubber surface by the edge 15 which contacts said surface coextensive with its width. As shown in the drawing, the sheet of material after leaving the roll 14 is passed over rolls 15 and 16 and wound on an arbor 17. Conveniently a fan 18 may be provided for projecting the blast of air along the length of sheeting between the rolls 15 and 16 to cause drying of the coating, which drying is aided by the fact that the sheeting after it leaves the rolls is somewhat warm. The coated sheet may then be heat treated to cure it, say by heating it to 270 degrees Fahrenheit for 3 hours.

The probable action which takes place in applying the coating is that the ammonium magnesium carbonate being unstable, especially when warm, breaks down to form minute particles of magnesium carbonate uniformly distributed throughout the shellac, the ammonia ($NH_3$) and alcohol contents passing off in vapor form and carrying with them the water content so that the magnesium carbonate is entirely "dry". The particles of magnesium carbonate as such are invisible, probably due to their transparent nature, and, without darkening the surface (which darkening if it occurred would necessitate the use of additional expensive coloring material to overcome it) act to give the surface a pleasing non-glossy "tulle" like appearance, this appearance probably due to the light refracting properties of the particles.

The exact amount of magnesium carbonate may be varied to vary the appearance of the treated surface, as for example, the amount of magnesium carbonate may be varied from ½ to 3 pounds to 1 to 6 gallons ammonia water.

As substitutes for magnesium carbonate, I may employ other metal carbonates such as zinc carbonate, lead carbonate, and silver carbonate, all of which are soluble in ammonia and inert with respect to rubber. Preferably magnesium carbonate is employed because of its cheapness and the facility with which it may be dissolved without formation of "lumps" in the solution. Those metal carbonates soluble in ammonia, such as copper carbonate, which deleteriously attack the rubber or the constituents of the rubber compound, it will be understood are not as suitable for use as those which are inert with respect to rubber.

It will be understood that other volatile solvents, such as ethyl alcohol and acetone, which dissolve shellac, may be employed. Methyl and ethyl alcohol, however, are to be preferred owing to their less inflammability and for other reasons. In practice the amount of alcohol may be varied to cause a thicker or thinner film of shellac on the material, and for usual conditions from about ½ to 4 pounds shellac to ½ to 2 gallons alcohol will give satisfactory results.

It has been proposed to harden the surface of a shellac coating on rubber coated textiles, after the shellac has dried, by treatment with bromine, with the result that not only are the operators exposed to highly disagreeable and dangerous fumes, but an inferior product is produced. It has been found that the shellac coating is broken in the form of microscopic cracks which expose the surface of the rubber to the action of the bromine, which as heretofore explained attacks the rubber by an oxidizing action, causing gradual deterioration of the rubber. This process also darkens the surface of the shellac necessitating, when the process is employed, the use of additional coloring material as hereinbefore explained.

It will be observed that the present process is distinguished from prior processes in that, among other things, the rubber surface is varnished and the stickiness of the product eliminated by use of substances substantially inert with respect to rubber, and with avoidance of dust and fumes and darkening the surface of the material.

In cases where it is desired to apply several layers of rubber to the textile sheet by progressively passing the same through the rolls of calendering machines, the shellac and alcohol may be omitted from the treating solution for all except the last coat of rubber applied, thereby causing the surface of the first rubber layers to be coated with a film of the mineral substance which will eliminate the tackiness of the rubber surface and permit the product to be handled. However, if desired, this solution may contain a small quantity of alcohol to facilitate drying.

Also, if desired, the coating material may be applied to the rubber surface after it is cured.

It will be understood that the above described apparatus and materials, and the particular steps of the method described, are illustrative only, and that wide deviations may be made from these within the scope of the invention without departing from its spirit.

Claims:
1. The process of forming rubber coated textile sheets which comprises coating a textile sheet with rubber compound by use of a calendering machine with hot rolls, and while the rubber is warm and tacky coating it with a liquid containing alcohol and ammonia solutions of shellac and a metal carbonate, drying the sheet, and afterward heat treating it for curing it.

2. The process of treating tacky rubber surfaces which comprises coating them with a liquid containing a volatile solution of shellac and an ammonia solution of a metal carbonate, the latter substantially inert with respect to rubber.

3. The process of treating tacky rubber surfaces which comprises coating them with a liquid containing a volatile solution of shellac and an ammonia solution of magnesium carbonate.

4. The process of treating tacky rubber surfaces which comprises applying thereto a film of liquid containing alcohol and ammonia solutions of shellac and a metal carbonate, and drying the film.

5. The process of treating tacky rubber surfaces which comprises applying thereto a film of liquid containing alcohol and ammonia solutions of shellac and a metal carbonate, drying the film, and heat treating the article for curing the rubber.

6. The process of preparing textile sheets coated with a calendered layer of rubber for use, which comprises applying thereto a film of volatile liquid containing shellac and an ammonia solution of a metal carbonate.

7. An article of manufacture having a rubber surface coated with a substantially transparent film comprising shellac through which are uniformly distributed microscopic, substantially invisible particles of a metal carbonate.

8. An article of manufacture having a rubber surface coated with a substantially transparent film comprising shellac through which are uniformly distributed microscopic, substantially invisible particles of magnesium carbonate.

9. Textile sheets coated with a vulcanized layer of rubber, the rubber surface coated with a substantially transparent film comprising shellac through which are uniformly distributed microscopic, substantially invisible particles of a metal carbonate.

10. Textile sheets coated with a vulcanized layer of rubber, the rubber surface coated with a substantially transparent film comprising shellac through which are uniformly distributed microscopic, substantially invisible particles of magnesium carbonate.

In testimony whereof, I have signed my name to this specification.

HANS RICHARD HAERTEL.